United States Patent Office 3,240,736
Patented Mar. 15, 1966

3,240,736
BINDER COMPOSITION
William F. Beckwith, Ansonia, Conn., assignor to Raybestos-Manhattan, Inc., Passaic, N.J., a corporation of New Jersey
No Drawing. Filed Nov. 13, 1961, Ser. No. 152,055
19 Claims. (Cl. 260—29.2)

This invention relates to improvements in binders and products produced therefrom, and particularly to a novel composition especially suitable for use in the building industry and is a continuation in part of my co-pending application Serial No. 55,138 filed September 12, 1960, now abandoned.

It is a particular object of the present invention to provide a novel binder or "mortar" composition adapted for bonding masonry units such as concrete, cinder and lightweight blocks, concrete, cinder, lightweight and red clay bricks, and cut stone and ceramic tile and other masonry type products, to each other or to themselves.

It is a further object of the present invention to provide a cementitious bonding material resistant to moisture and weathering conditions and which substantially eliminates the necessity for maintenance.

It is a further object of the present invention to provide a novel mortar which has high tensile strength, as distinguished from conventional mortar, so that production of a subassembly of concrete products or wall sections is possible, since the line of bond formed with the composition of the present invention is stronger than the joined blocks or bricks themselves and will, therefore, not be destroyed at the bond line in handling or transportation.

A further object of the present invention is to provide a mortar for building construction which may be spread in relatively thin layers as compared to the practice with conventional mortar, and yet with increased tensile strength.

A further object of the present invention is to provide a novel structural bonding composition having such high compressive and tensile strength that the need for reinforcing in the mortar joint ordinarily used with blocks of the cement, cinder or lightweight type can in some instances be dispensed with.

A further object of the present invention is to provide a novel structural bonding composition adapted for use as aforesaid which, while having high tensile strength, is possessed of inherent flexibility so that it eliminates or substantially eliminates the need for conventional expansion joints as heretofore employed with cement block construction.

It is a further object of the present invention to provide a plastic binder composition characterized by both inorganic and organic curable binder components.

It is a further object of the present invention to provide novel cured products composed of the foregoing binder composition, or products employing same as a characterizing component.

The general composition of the present invention comprises the employment of an ambient temperature curable liquid synthetic resin and an ambient temperature curing agent therefor; an hydraulic cement and sufficient water to cure the cement; and a plasticizing agent for the composition.

Typical ambient temperature curable resins which can be used as the resin binder constituent are epoxy resins, resorcinol resins, urethane resins, polyester resins, silicone resins, furfural resins, polysulfide resins and their mixtures. These resins in combination with suitable curing agents will provide a workable mortar mix which will cure without the aid of added heat.

The epoxy resins useful in the present invention are organic compounds which contain at least one oxirane group and polymerizable functionality with ambient temperature curing agents. (This additional polymerizable functionality can be represented by unsaturation, hydroxyl substituents, halogen substituents, amino substituents, and various combinations thereof.)

A typical epoxy resin, which can be used as the resin binder constituent in the present invention, is one containing terminal epoxy groups. Representative of this class is the complex polymeric reaction product of polyhydric phenol with polyfunctional halohydrin, such as epichlorohydrin and glycerol dicholorohydrin. Usually the difunctional chlorohydrin is used in proportions in excess of that equivalent to the polyhydric phenol and less than that which is twice the equivalent amount. The reaction is carried out in the presence of caustic alkali which is usually employed in at least the quantity necessary to combine with the halogen halide liberated from the halohydrin and usually is employed in excess. The products obtained may contain terminal epoxy groups or terminal epoxy groups and terminal primary hydroxyl groups. In the complex reaction mixture, the terminal epoxy groups are generally in excess of the terminal primary hydroxyl groups. Typical polyhydric phenols include resorcinol and preferably the various bisphenols resulting from the condensation of phenol with aldehydes or ketones such as formaldehyde, acetaldehyde, acetone, methyl ethyl ketone, and the like, but preferably acetone or formaldehyde.

The molecular weight of the epoxy resins may be controlled by the relative proportions of the reactants as well as by the extent to which the reaction is carried on. Although the molecular weight of the resin is not critical, the resin should normally be in the form of a liquid, or a solid dissolved in a liquid.

The solid epoxy resins may be dissolved in a solvent such as ethylene glycol, methyl or ethyl ether, or in a reactive diluent such as allyl glycidyl ether or butyl glycidyl ether. The resins further may be modified by materials such as dibutyl phthalate.

The typical commercial epoxy resins, above mentioned and employed herein, are mixtures of polymers, the major component of the resin being the polyglycidyl ethers of polyhydric phenols such as bisphenol-A, and epichlorohydrin. By using an excess of epichlorohydrin, the lower molecular weight liquid polymers are formed, and with higher proportions of bisphenol higher molecular weight solid resins result.

A typical epoxy resin is an amber-colored liquid epoxy resin of medium viscosity at room temperature having an epoxy value of 0.355–0.400 per 100 grams. Another is a liquid epoxy resin having an epoxide equivalent of 180–195 grams of resin containing one gram equivalent of epoxide. Another is a liquid epoxy resin which has a viscosity of 450–650 centipoises at 25° C. and a weight per epoxide of 375–400.

A typical solid epoxy resin which can be used is one which has a softening point at 65–75° C. and an epoxide equivalent of 425–550. Another is one having a softening or melting point of 90–110° C. and an epoxy equivalent of 700–1000. The liquid and solid epoxy resins may be heated together in suitable proportion to form normally liquid resin mixtures. They may be also dissolved in reactive diluents or solvents.

Other typical known and useful epoxy resins are: epoxidized novolak resins prepared by condensing epichlorohydrin with novolak resin; aliphatic polyepoxides such as: poly allyl glycidal ether, butadiene dioxide, and 1,4-butandiol prepared from aliphatic unsaturated hydrocarbons such as butadiene, by epoxidation with peracetic acid; resorcinol diglycidal ether prepared from resorcinol and epichlorohydrins, by condensation or substitution; ortho cresol glycidal ethers prepared from cresols and polyglycidal ethers by condensation; epoxidized amino phenols prepared from para amino phenol condensation products containing unsaturation which is epoxidized by peracetic acid; aliphatic unsaturated polyepoxides prepared by selective epoxidation of unsaturation in hydrocarbon compounds; brominated and chlorinated polyepoxides prepared by bromination or chlorination of unsaturation in epoxide-containing compounds or by substitution of halogen in epoxides; phosphate based polyepoxides based on condensation of phosphate compounds and epichlorohydrin; epoxidized oils such as linseed oil and soybean oil; trifunctional aromatic epoxides composed of aromatic hydrocarbon compounds selectively substituted and epoxidized by peracetic acid; and phenol formaldehyde modified epoxide containing materials.

The ambient temperature curing agent for the foregoing epoxy resin binder component of the present invention can be a polyamide resin, such as those derived from polymeric fat acids and aliphatic polyamines. Typical of these polyamides are those made by reacting polymeric fat acids with ethylene diamine and/or diethylene triamine and the like. By this is meant poly alkyl polyamines and their homologs and derivatives. It is possible to produce agents having terminal amine groups or terminal carboxyl groups or in which some of the terminal groups are amine groups while others are carboxyl groups. Since both amine groups are useful in curing the epoxy resins, it will be apparent that a wide variety of these polyamides are useful for that purpose. Since the amine groups react more rapidly in curing the epoxy resin, it is preferred to employ polyamides containing sufficient amine groups to provide adquate cross linkage. Slower curing may be obtained by the use of those polyamides having excess carboxyl groups over the amine groups.

The polymeric fatty acids employed in preparing the polyamides are those resulting from the polymerization of drying or semidrying oils or the free acids or simple aliphatic alcohol esters of such acids. Suitable drying or semidrying oils include soy bean, linseed, tung, parilla, oiticica, cotton seed, tall, sunflower, safflower, dehydrated castor oil, and the like. In the polymerization process for the preparation of the polymeric fat acids, the fatty acids with sufficient double bond functionally combine for the most part to provide a mixture of dibasic and higher polymeric acids. The most common of these dimerized acids is dilinoleic acid. The term "polymeric fat acids" as used herein is intended to include the polymerized mixture of acids obtained, which mixtures usually contain a predominant portion of dimeric acids, a smaller quantity of trimeric and higher polymeric acids, and some residual monomer.

These polymeric fat acids may be reacted with a variety of aliphatic polyamines for the production of the polyamide resin. The amidification reaction may be carried out under the usual conditions employed for this purpose. Polyamides of this type generally have molecular weight varying from less than 1,000 to 10,000.

Typically suitable commercial polyamides are the commercial Versamids 125, 115, or 140, Lancast A, and Sotex 45A made by the condensation of dimerized or trimerized unsaturated fatty acids of vegetable oils, such as dilinoleic acid with aliphatic amines such as ethylene diamine. Versamid 125 is a liquid having a viscosity of 80–120 centipoises at 40° C.

Other ambient temperature liquid curing agents for the epoxy resins can also be used, some of which are co-reactants which require small amounts of catalytic agents in order to provide cures at ambient temperatures encountered with masonry construction. An example of such a co-reactant is a polysulfide which is a polythiodithio polymer of low molecular weight of which is prepared from 98 mole percent of bis(2-chloroethyl) formal and 2 mole percent of trichloropropane.

A typical catalyst for such a co-reactant is 2,4,6-tridimethyl aminomethyl phenol known as D.M.P.-30. Such dimethylamino-methyl phenols are Mannich type bases produced by reaction of the appropriate phenol with formaldehyde and dimethyl amine.

The resin curing agent can also be modified with relatively small quantities of acids, amines, amides, and other basic components which have proved to be reactive with epoxy resins for the purposes of controlling the cure rate of the epoxy resins. Some of these reactive modifiers are aliphatic and aromatic primary, secondary, and tertiary amines, for example, mono-, di- and triethanol amines, dimethylaminoethanol, 2-ethyl-hexyl-amine, di-isopropyl amine, diethylaminopropylamine, triethyl amine, tetraethylene pentamine, triethylene tetramine, diethylene triamine, dibutylaminopropyl amine, menthane diamine, 2,4,6-tridimethyl-aminomethyl phenol, metaphenylene diamine, N, benzyl methylamine, piperidine, piperazine, pyridine, methyl nadic anhydride, alkendic anhydride, N, methyl morpholine, and tetramethylethylene diamine. Other suitable modifiers are aromatic and aliphatic polyamine adducts, for example, an epoxy resin based on epichlorohydrin and bisphenol with an epoxide equivalent of 190–200 reacted with one mole of active hydrogen in diethylene triamine, propylene oxide reacted with diethylene triamine, and various materials prepared by modifying the above with acrylonitrile and bisphenol in varying percentages usually from 10 to 30% by weight. Aromatic polyamine adducts prepared by mixing one or more aromatic amines such as meta phenylene diamine or 4,4'-diaminodiphenyl methane in excess with small quantities of bisphenol-A, styrene oxide, or epichlorohydrin-bisphenol liquid resins of low molecular weight; have proved valuable as reactive modifiers when used in relatively small amounts.

The epoxy resin-cure agent system can be extended by one or more natural or synthetic non-reactive filler resins. Typical examples of such suitable resins and rosins are: polynuclear aromatic hydrocarbon mixtures, thermoplastic styrenes, para - coumarone - indenes, beta - pinenes, phenol modified coumarone indenes, methyl esters of rosin, primary alcohols from rosin, esters of polymerized rosin, chlorinated biphenol and polyphenols, ethylated sulfonamides, alkyl aryl phosphates, condensation products of aryl sulfonamides and formaldehyde, and rosin modified phenolic and maleic resins. These modifiers can be added for the purpose of economy or modification of physical properties such as workability, tack, potlife, etc.

The epoxy and polyamide resins can be blended together to form the organic component of the binder system of the present invention. The relative amounts of the two resins may be varied within certain limits. Generally, the amounts by weight of the epoxy resin and polyamide resin will be in a ratio of epoxy-polyamide from about 10:90 to about 80:20. A preferred range is an epoxy-polyamide ratio of about 60:40. With higher amounts of the polyamide curing agent flexibility increases and strength decreases.

Other ambient temperature curable synthetic resins which may be used in replacement of all or a part of the previously described epoxy resins are the resorcinol base resins. Thus, by reacting one mole or resorcinol with substantially less than one mole of formaldehyde, resins are obtained which can be dissolved in a solvent medium usually water and alcohol. By adjusting the pH to approximately 7, an adhesive base is formed which can be set in the presence of a hardening agent, generally formalin or paraformaldehyde. In a similar manner, copolymer phenol-resorcinol-formaldehyde adhesives can be prepared that set at a pH of about 8.

A commercial product known as Penacolite Adhesive G-1215 can be used. This is composed of two components, one designated as G-1215A being an alcohol-water solution of a partially condensed phenol-resorcinol-formaldehyde resin, and the other G-1215B, a tan powder composed of paraformaldehyde and walnut shell flour filler. This resin and hardener begin to react as soon as they are mixed and set to a solid gel at room temperature.

Other ambient temperature curable resins are polyurethane based materials which we obtained by reacting a diisocyanate such as toluene diisocyanate with a hydroxyl containing material such as castor oil. An example of such a material is Adiprene L which is a honey colored liquid reaction product of toluene diisocyanate and a polytetramethylene glycol with an average moleculare weight of 2000.

Another specific example of a urethane resin is a reaction product of diphenylmethane 4,4'-diisocyanate and castor oil. A further example of a urethane resin is the reaction product of bitolylene diisocyanate and propylene glycol monoricinoleate.

Suitable ambient temperature cures are obtained when the above resins are reacted with an amine catalyst such as morpholine or N-ethyl morpholine.

Suitable polyesters are then produced by the condensation of a poly carboxylic acid or anhydride with a polyol, one or both of which possess ethylene unsaturation. These polyesters are then diluted with 25 to 40% styrene or other binyl type unsaturated compound, to obtain the ambient temperature curable resins.

Such a resin can be prepared by reaction of equal parts of maleic and phthalic anhydrides with a slight excess of propylene glycol by esterification to an acid number of about 60. This reaction product is then diluted with styrene equal to about 30% by weight to produce a known commercial product.

If desired maleic and phthalic anhydride can be replaced by fumaric, adipic, succinic, azelic, or sebacic acids and propylene glycol can be replaced by ethylene glycol, diethylene glycol, dipropylene glycol, or 2,3- and 1,3-butandiol.

A commercial polyester is sold under trade names such as Heteron which contains chlorine derived from the adduct of maleic anhydride and hexachlorocyclopentadiene.

Suitable ambient temperature curing agents for these resins are peroxides such as tertiary butyl peroxide, methyl ethyl ketone peroxide, benzoyl peroxide, and metal complexes such as cobalt napthenate usually a solution of about 6% or less.

A silicone resin of the polysiloxane type or more specifically a methyl phenyl silicone resin prepared as in U. S. Patent No. 2,258,222 with an average of 1.5 total methyl and phenyl groups per silicone atom was successfully used in this composition. The commercial product name is SR-17 and it was cured by a low molecular weight polyamide.

Furane resins are condensation products of furfuryl alcohol and aldehydes which can be cured with acid catalysts such as hydrochloric, sulfuric, phosphoric and toluene sulfonic at ambient temperatures.

The plasticizer components of the present invention are thermoplastic materials such as an aqueous latex of commercial solids content wherein the dispersed material is natural rubber or a synthetic rubber, examples of the latter being styrene rubbers such as copolymers of styrene and butadiene or acrylonitrile; polychloroprene and butyl rubber.

Latices of synthetic and natural resins such as polyvinyl butyral, polyvinyl, acetate, poly methyl methacrylate and copolymers thereof, plasticized petroleum resins, terpene hydrocarbons, and rosin can also be used. The synthetic resin polyacrylamide can be employed in an aqueous solution.

Other plasticizers include solvent solutions of polymeric materials such as: polyvinyl butyral, polyvinyl formal, polychloroprene rubber, butadiene acrylonitrile rubber, chlorinated natural rubber, butadiene styrene rubber, polyurethane rubber, acrylic resin esters, and polyvinyl acetate.

Still other plasticizers are low molecular weight fluids or polymers, which provide desirable working properties, such as ethylene glycol, liquid polyurethanes, liquid polysulfides, liquid butadiene styrene rubber, liquid butadiene acrylonitrile rubbers, and liquid polyglycols and substituted polyglycols.

The incorporated plasticizer not only enhances flexibility and reduces brittleness of the set or hardened composition, but also provides a smooth cohesive viscosity to the unset mixture which aids in distribution thereof and enhances the compatibility of the inorganic binder system with the organic binder system.

Certain plasticizers such as ethylene glycol improve working characteristics such as viscosity reduction and spreadability and incidentally lower freeze point.

The hydraulic cement employed in the present invention can be the conventional hydraulic cements such as Portland cement; La Farge, a grappier derived from hydraulic lime; lime; Roman cement, a cement made by heating clay and limestone; blast furnace slag cement; Keene's cement, which is a form of dehydrated gypsum with small amounts of accelerators such as alum or potassium sulfate added; conventional gypsum; plaster of Paris; calcium aluminate; pozzolana, a natural cement; and the like which when mixed with water, set or cure to form a solid rigid mass. It will be understood that the foregoing do not all act in an identical manner. For example, conventional gypsum sets quite rapidly as compared to Portland cement, and while these two do not per se form solids of the same bond strength, they both produce strong bonds and high strength in the compositions of the present invention. Conventional accelerators and retarding agents for the various cements can also be added.

It will be understood that in each instance where the hydraulic cements are employed in the present invention, sufficient water is added to completely hydrate and cure the cement. Some of the necessary water may be derived from some of the other composition components, for example, from the plasticizers when they are employed in the form of aqueous emulsions, i.e., the rubber latices.

Other nonreactive organic and inorganic fillers and modifiers such as asbestos, hollow phenolic spheres known as microballoons, carbon blacks, talcs, calcium carbonates, glass fibers, sand, micas, wood flour, clays, silicas, barytes, aluminum oxides, zinc oxides, lead oxides, titanium dioxides, and liquid-solid dispersions such as asbestos in water, lead oxides in glycerin, silicas in waterglass, barytes in waterglass, calcium carbonates in waterglass, etc., can be added to or used as a partial replacement of the above mentioned hydraulic cements. These modifiers are added to increase bulk, reduce cost, add thixotropy, or other specific properties. Partial replacement can be made with these modifiers where ultimate strength is not as important as cost, viscosity, thixotropy, bulk, etc. or when the present compositions are used as caulking or sealing materials.

For the purpose of developing special characteristics, various other additives can be incorporated into the present compositions. Pigments or dyes can be introduced for the purpose of matching color of mortar to material being bonded. Surface active agents such as the aryl alkyl sulfonates and others can be added or introduced to give a smoother working mixture, reduce time of mixing, reduce number of operations in mixing, avoid lumps or agglomerates in the mix, reduce viscosity, or to provide better surface wetting, etc. Other specific properties can be gained by adding freeze resistant agents, antibacterial agents, and the like.

The components forming the composition of the present invention can be employed in the following proportions or parts by weight, which are given for the purpose of illustration and not limitation.

In the present invention, the hydraulic cement is a characterizing component and comprises from about 20% to about 85% by weight of the solids in the composition.

The curable organic binder, i.e., resin plus curing agent, likewise being a characterizing component comprises from about 10% to about 50% by weight of the total solids in the composition.

The plasticizer which is also a characterizing component comprises from about 2% to about 25% of the total solids.

The balance, if any, is composed of the unreactive resins and unreactive inorganic and other fillers herebefore specified, their amounts being to some extent also proportional to their volumes, upper limits being dependant on strength desired since excess amounts cause loss of strength. Generally the amount of unreactive resins or rosins should not be more than twice the weight of the reactive resin-curing agent binder component.

*Example 1*

|  | P.b.w. |
|---|---|
| Portland cement | 50 |
| Plasticizer (butadiene-styrene, 45% latex-solids) | 8 |
| Water (from latex and added) | 19.4 |
| Epichlorohydrin-bisphenol-A liquid epoxy resin, epoxy equivalent weight 175–210 | 12.45 |
| Liquid polyamide, amine value 290–320 obtained by condensation of dilinoleic acid and ethylene diamine | 7.7 |

In the foregoing example the Portland cement ratio may be varied from about 10 to about 150 parts by weight (p.b.w.) provided sufficient water is present to cure the cement.

The plasticizer content of this example may be varied from about 2 to about 16 p.b.w. depending upon viscosity, strength, mixing, or other properties desired of this system.

Water should be present in sufficient quantity to allow the hydraulic cement to cure, and is useful in the proportions of from about 33% to about 67% by weight of the Portland cement.

The epoxy-polyamide content of this example may be varied from about 10 to about 60 p.b.w. depending upon strength, viscosity, flexibility, etc., both in the uncured state and in the cured system.

The ratio of epoxy to polyamide may be varied from 10 p.b.w. epoxy to 90 p.b.w. polyamide or 20 p.b.w. polyamide to 80 p.b.w. epoxy. Depending upon the epoxide equivalent-amine value, the ratios of epoxy to polyamide may be varied to suit these values in this operable formulation.

*Example 2*

| Portland cement | 200 |
|---|---|
| Plasticizer (total butadiene-acrylonitrile copolymer latex solids) | 8 |
| Water | 90 |
| Epoxidized novalak, resin, epoxy equivalent weight 180–220 | 45 |
| Polyamide with amine value in range of 290–320 | 30 |
| Phenol aldehyde microballoons | 40 |

*Example 3*

| Keene's cement | 200 |
|---|---|
| Plasticizer (solution of butadiene-acrylonitrile copolymer rubber in methyl ethyl ketone 5 to 30% solids) | 8 |
| Water | 160 |
| Epoxidized p-amino phenol type resin | 45 |
| Polyamid resin with amine value 350–400 | 30 |
| Asbestos dispersed in water (solids) | 25 |

*Example 4*

| Slag cement | 200 |
|---|---|
| Plasticizer (liquid butadiene-styrene coploymer rubber) | 17 |
| Water | 90 |
| Epoxy resin poly allylglycidyl ether type | 45 |
| Polyamide, amine value 210–220 | 30 |
| Sand (suitable for mortars) | 400 |

*Example 5*

| Calcium aluminate | 200 |
|---|---|
| Plasticizer (50% solids polyvinyl acetate emulsion) | 15 |
| Water | 100 |
| Epoxy resin, ortho cresol glycidyl ether type | 50 |
| Polyamide-amine value 210–220 | 35 |
| Aluminum silicate | 250 |

*Example 6*

| Portland cement | 200 |
|---|---|
| Plasticizer (19% solution of polyvinyl butyral in butanol) | 45 |
| Water | 100 |
| Epoxy resin, butadiene dioxide | 45 |
| Polyamide resin, amine value 89–93 | 30 |
| Accelerator | 2–15 |
| Chopped glass fibers | 20 |

Accelerator was an adduct prepared by reacting one mole of active hydrogen in diethylene triamine with an epoxy resin with an epoxide equivalent of 175–210 which is based on epichlorohydrin and bisphenol-A. The range given will produce various reaction rates with the lower proportion being the slowest and the higher range very fast curing. Addition of this accelerator may be most desirable when the mortar composition must be applied at temperatures at or below 32° F.

*Example 7*

| Portland cement | 200 |
|---|---|
| Plasticizer (butadiene-styrene copolymer latex solids) | 10 |
| Water | 125 |
| Resorcinal-diglycidal ether epoxy resin | 45 |
| Methyl ester of rosin [1] | 45 |
| Polyamide resin, amine value 290–320 | 30 |
| Calcium carbonate | 150 |

[1] Modifier added to improve flow of final mix and reduce cost.

*Example 8*

| Portland cement | 200 |
|---|---|
| Plasticizer (polychloroprene latex solids) | 8 |
| Water | 90 |
| Epoxidized novolak epoxy resin, equivalent weight 225–350 | 25 |
| Alkyl aryl phosphate [1] | 25 |
| Polyamide resin-amine value 290–320 | 15 |

[1] Modifier is not reactive but here replaces part of epoxy-polyamide portion of mix because it is desirable where ultimate strength is not essential but lowest cost is essential.

*Example 9*

| Gypsum | 200 |
|---|---|
| Plasticizer (butadiene-styrene copolymer latex solids) | 8 |
| Water (total) | 90 |
| Bisphenol-epichlorohydrin epoxy resin, epoxy value per 100 g.—.355–.40 | 45 |
| Polyamide resin | 30 |
| Amine | 2–15 |

The amine described in this example and elsewhere in this application can be used to either accelerate or retard the reaction mixture depending upon the end use or working life necessary for best results.

The amine employed here was 2,4,6-tridimethylaminomethyl phenol to accelerate the reaction.

Example 10

| | |
|---|---|
| Portland cement | 200 |
| Butadiene styrene copolymer latex (solids) | 16 |
| Water (total) | 95 |
| Urethane resin (adiprene L167) | 68 |
| Methylene 4,4'-methylene-bis-(2-chloroaniline) cure agent for resin | 9 |

Example 11

| | |
|---|---|
| Portland cement | 200 |
| Butyl rubber latex (solids) | 16 |
| Water (total) | 95 |
| Polyester resin (Laminac 4110) | 74 |
| Tertiary butyl hydroperoxide | 1 |
| and benzoyl peroxide to cure resin | 2 |

Example 12

| | |
|---|---|
| Portland cement | 200 |
| Butadiene styrene copolymer latex (solids) | 16 |
| Water (total) | 95 |
| Silicone resin (SR17) | 62 |
| Polyamide resin—amine value 290-320 | 15 |

Example 13

| | |
|---|---|
| Portland cement | 200 |
| Styrene polymer latex (solids) | 16 |
| Water | 95 |
| Resorcinol resin (Penacolite G1131) | 64 |
| Paraformaldehyde | 13 |

Example 14

| | |
|---|---|
| Portland cement | 200 |
| Styrene polymer latex (solids) | 16 |
| Water (total) | 95 |
| Furane Resin | 73 |
| Acid curing agent dissolved in resin | 4 |

Example 15

| | |
|---|---|
| Portland cement | 200 |
| Butadiene styrene copolymer latex (solids) | 16 |
| Water (total) | 95 |
| Bisphenol-epichlorohydrin epoxy resin, equivalent weight of 175-200 | 50 |
| Polysulfide resin (LP8) | 26 |
| 2,4,6-tri-dimethyl amino methyl phenol | 2 |

In preparing the compositions of the present invention, the various components are generally maintained separate until shortly before use because of their ambient temperature curing properties. In some instances, two or more components which do not react with each other can be pre-mixed.

When a composition such as in Example 1 is employed, the components are each separately packaged, except that the latex plasticizer, generally contains the entire water requirements for curing the hydraulic cement. This latex is then mixed with the hydraulic cement to form a mix free of lumps. Cure of the cement is initiated upon contact with the water.

The reactive liquid resin is separately mixed with the ambient temperature curing agent to form a homogeneous mass, cure of the resin also starting promptly upon mixture of the two.

Immediately after these separate pre-mixes are made they are mixed together. Further cure of the blend takes place accompanied by a change in viscosity from a thin watery mix to a smooth creamy almost pourable heavy paste.

A similar mix can be made by pre-mixing the water, latex, and liquid epoxy resin. This is then mixed in the order of cement to the above mentioned liquids until a smooth consistency is obtained, followed by addition of the resin curing agent.

When a solvent solution or normally liquid plasticizer is used, it may be added to the water or resin components, depending upon compatibility.

Any filter materials employed can here be incorporated with either the hydraulic cement-plasticizer pre-mix or into the final mixture.

The final mixture or mortar remains plastic for about one to about two hours, during which time it is applied by suitable spreading means, depending upon its consistency or viscosity, such as a brush, trowel, or roller or caulking gun.

The need for expansion joints hitherto conventional with cement block construction may be eliminated because the resin and latex solids content of the present invention give the mortar flexibility.

Structures made from cement blocks joined by the mortar of the present invention in many instances have adequate strength to eliminate need for steel reinforcing in the mortar joint.

The composition does not require any heat cure; it sets in about ten minutes to two hours sufficiently so that one cement block will remain joined to another sufficiently to be lifted without other support; and block or bricks joined together have such tensile strength, as distinguished from conventional mortar, that prefabricated sections of walls may be built up for later installation in place.

The composition also passes a four hour fire endurance and hose stream test when tested in accordance with ASTM E-119. It is also classified as nonburning and non-inflammable when tested in accordance with ASTM D-635.

In forming a wall structure from cement blocks of 8 x 8 x 16 inch dimension, strips or beads $\frac{1}{32}$ to $\frac{1}{4}$-inch diameter can be extruded from a caulking gun to apply two 8-inch strips on one end, and two 16-inch strips on the upper surface, and the structure thus built up. (The beads are normally laid on the horizontal surface of the previously laid course, and on the 8-inch dimensions on one end of the block which when positioned are vertical in the structure.)

The following is an example of bond strength of fired red clay bricks bonded together with the composition of the foregoing example, as exemplary of the present invention, as compared to conventional mortar, in pounds per square inch over a period of time as indicated:

| Days | 4 | 11 | 20 | 29 |
|---|---|---|---|---|
| Conventional Mortar | 59 | 50-70 | 50-70 | 50-70 |
| Present "Mortar" | 370 | 400 | 400 | 400 |

Tests were in accordance with ASTM C321.

After 29 days the conventional mortar fails at the bond line between the brick and mortar, whereas with the present composition after 4 days there is consistent failure in the bricks and not at the bond line.

In a further comparative test of strength, $\frac{3}{8}$-inch thick masonry cement mortar joints had a compressive strength of 2170 p.s.i. at 1 day, 2420 p.s.i. at 28 days and 3500 p.s.i. after 1 year whereas joints formed with the composition of the present invention of $\frac{1}{32}$, $\frac{1}{16}$, and $\frac{1}{8}$ inches in thickness at test temperature of 70° F., 100° F., and 150° F. all showed compressive strength in excess of 50,000 pounds per square inch after 1 day. Values after 28 days and 1 year are also in excess of 50,000 p.s.i.

Joints formed from the compositions of the present invention have greater freeze-thaw durability than conventional masonry mortar joints when tested in accordance with ASTM C310.

In addition to masonry use, the composition of the present invention can be used as a sealing and bonding agent for such things as swimming and wading pools, porches and steps, replacement of tar on highways for filling in of cracks, highway and city curbings, house porches and patios, cement footing, restoration of brick chimneys and stucco finishes, hydraulic dams, concrete piping for water systems, concrete septic tanks, prestressed concrete, tree sealants, puncture repairs and many others, as will be apparent to those skilled in the art.

In addition the cured composition can be used per se in suitable shaped form such as wallboard, piping, art objects, blocks, burial vaults, tanks and other receptacles.

The compositions of the present invention are also useful for bonding diverse materials such as wood, metals, plastics, ceramics, and others.

I claim:

1. A plastic, aqueous binder composition comprising a mixture of the following in parts by weight of solids; from about 20 to about 85 hydraulic cement; from about 2 to about 25 polymeric latex plasticizer for the composition of the group consisting of rubbers and synthetic thermoplastic resins; from about 10 to about 50 liquid synthetic thermosetting ambient temperature curable resin selected from the group consisting of epoxide, polyurethane, polyester and silicone, and curing agent therefor which is a polyamide for the epoxide, an amine for the polyurethane, a peroxide for the polyester and a low molecular weight polyamide for the silicone, wherein the resin is from about 60 to about 95 percent by weight and the curing agent is the remainder; together with water for curing said cement.

2. The composition of claim 1 wherein the resin is an epoxide.

3. The composition of claim 1 wherein said resin is a polyurethane resin.

4. The composition of claim 1 wherein said resin is a polyester resin.

5. The composition of claim 1 wherein the resin is a silicone resin.

6. The composition of claim 1 wherein the resin is an epoxide containing at least one oxirane group.

7. The composition of claim 6 wherein the curing agent is a polyamide.

8. The composition of claim 1 wherein the cement is Portland cement.

9. The composition of claim 1 where the cement is calcium aluminate.

10. The composition of claim 1 where the cement is composed of a gypsum.

11. A plastic, aqueous binder composition comprising a mixture of the following in parts by weight of solids; from about 20 to about 85 hydraulic cement; from about 2 to about 25 polymeric latex plasticizer for the composition of the group consisting of rubbers and synthetic thermoplastic resins; from about 10 to about 50 liquid synthetic thermosetting ambient temperature curable resin selected from the group consisting of epoxide, polyurethane, polyester and silicone and curing agent therefor which is a polyamide for the epoxide, an amine for the polyurethane, a peroxide for the polyester and a low molecular weight polyamide for the silicone, wherein the resin is from about 60 to about 95 percent by weight and the curing agent is the remainder; together with water for curing said cement and from about 1 to about 68 of inert filler material.

12. The composition of claim 11 where said filler is organic resinous material.

13. The composition of claim 11 where said filler is inorganic material.

14. A product composed of the dried and cured residue of the composition of claim 1.

15. A product composed of the dried and cured residue of the composition of claim 11.

16. The process of forming a plastic, aqueous binder composition comprising a mixture of the following in parts by weight of solids; from about 20 to about 85 hydraulic cement; from about 2 to about 25 polymeric latex plasticizer for the composition of the group consisting of rubbers and synthetic thermoplastic resins; liquid synthetic thermosetting ambient temperature curable resin selected from the group consisting of epoxide, polyurethane, polyester and silicone and from about 10 to about 50 curing agent therefor which is a polyamide for the epoxide, an amine for the polyurethane, a peroxide for the polyester and a low molecular weight polyamide for the silicone, wherein the resin is from about 60 to about 95 percent by weight and the curing agent is the remainder; together with water for curing said cement which comprises separately mixing said cement, plasticizer and water; separately mixing said resin and curing agent; and then promptly admixing said separately formed mixes.

17. The method of bonding masonry units together which comprises interposing between the adjacent surfaces of said units a plastic aqueous binder composition comprising a mixture of the following in parts by weight of solids; from about 20 to about 85 hydraulic cement; from about 2 to about 25 polymeric latex plasticizer for the composition of the group consisting of rubbers and synthetic thermoplastic resins; from about 10 to about 50 liquid synthetic thermosetting ambient temperature curable resin selected from the group consisting of epoxide, polyurethane, polyester and silicone, and curing agent therefor which is a polyamide for the epoxide, an amine for the polyurethane, a peroxide for the polyester and a low molecular weight polyamide for the silicone, wherein the resin is from about 60 to about 95 percent by weight and the curing agent is the remainder; together with water for curing said cement.

18. The dried and cured residue of the method of claim 16.

19. The dried and cured residue of the method of claim 17.

References Cited by the Examiner

UNITED STATES PATENTS

| | | | |
|---|---|---|---|
| 2,311,233 | 2/1943 | Jaenicke et al. | 260—29.6 |
| 2,819,239 | 1/1958 | Eberhard | 260—29.6 |
| 2,872,427 | 2/1959 | Schroeder | 260—29.2 |
| 2,879,252 | 3/1959 | Been et al. | 260—837 |
| 2,935,488 | 5/1960 | Phillips et al. | 260—830 |

FOREIGN PATENTS 231,242  3/1925  Great Britain.

OTHER REFERENCES

Bakelite, "C-8 Epoxy Resins," Bakelite Co., New York, N.Y., (1954).

MURRAY TILLMAN, *Primary Examiner.*

LEON J. BERCOVITZ, *Examiner.*